(12) United States Patent
Clarke (10) Patent No.: US 8,831,515 B2
(45) Date of Patent: Sep. 9, 2014

(54) SHAPED LOAD MODULATION IN A NEAR FIELD COMMUNICATIONS (NFC) DEVICE

(75) Inventor: David S. Clarke, Swindon (GB)

(73) Assignee: Broadcom Corporation, Irvine, CA (US)

( * ) Notice: Subject to any disclaimer, the term of this patent is extended or adjusted under 35 U.S.C. 154(b) by 135 days.

(21) Appl. No.: 13/271,553

(22) Filed: Oct. 12, 2011

(65) Prior Publication Data

US 2013/0095752 A1 Apr. 18, 2013

(51) Int. Cl.
*H04B 5/00* (2006.01)

(52) U.S. Cl.
USPC .................. 455/41.1; 455/41.2; 455/41.3

(58) Field of Classification Search
USPC ............................. 455/41.1–41.3
See application file for complete search history.

(56) References Cited

U.S. PATENT DOCUMENTS

| | | | |
|---|---|---|---|
| 6,054,892 A | 4/2000 | Miles et al. | |
| 6,567,394 B1 * | 5/2003 | Arisawa | 370/343 |
| 7,881,665 B2 | 2/2011 | Symons | |
| 7,986,916 B2 | 7/2011 | Williams | |
| 8,078,225 B2 | 12/2011 | Kargl et al. | |
| 8,140,010 B2 | 3/2012 | Symons et al. | |
| 8,150,321 B2 | 4/2012 | Winter et al. | |
| 8,181,875 B2 | 5/2012 | Nishido | |
| 8,204,531 B2 | 6/2012 | Jin et al. | |
| 8,233,842 B2 | 7/2012 | Symons | |
| 8,249,500 B2 | 8/2012 | Wilson | |
| 8,260,199 B2 | 9/2012 | Kowalski | |
| 8,272,573 B2 | 9/2012 | Hartel | |
| 8,282,009 B2 | 10/2012 | Ahn et al. | |
| 8,326,224 B2 | 12/2012 | Butler | |
| 8,422,946 B2 | 4/2013 | Bangs et al. | |
| 8,432,293 B2 | 4/2013 | Symons | |
| 2005/0224589 A1 | 10/2005 | Park et al. | |
| 2005/0252978 A1 | 11/2005 | Nishizawa et al. | |
| 2006/0061432 A1 | 3/2006 | Hsu et al. | |
| 2006/0125508 A1 | 6/2006 | Glidden, III et al. | |

(Continued)

FOREIGN PATENT DOCUMENTS

| | | |
|---|---|---|
| CN | 101252294 A | 8/2008 |
| JP | 2010-108485 A | 5/2010 |

(Continued)

OTHER PUBLICATIONS

International Standard: ISO/IEC 21481, *Information Technology—Telecommunications and information exchange between systems—Near Field Communication Interface and Protocol-2 (NFCIP-2)*, pp. 1-12, First edition, Reference No. ISO/IEC 21481:2005(E), ISO/IEC (Jan. 2005).

(Continued)

*Primary Examiner* — Tuan H Nguyen
(74) *Attorney, Agent, or Firm* — Sterne, Kessler, Goldstein & Fox P.L.L.C.

(57) ABSTRACT

A method and apparatus is disclosed to compensate for overshoot and/or undershoot in a transmission sequence by shaping the transmission sequence according to a shaping envelope to lengthen its rise time and/or fall time to provide a modified transmission sequence. The shaping envelope may represent a trigonometric function, a polynomial function, a piecewise function or any other function that lengthens the rise time and/or the fall time of the transmission sequence. The modified transmission sequence adjusts an impedance of an antenna to load modulate a carrier wave that is inductively coupled to it.

22 Claims, 6 Drawing Sheets

(56) References Cited

U.S. PATENT DOCUMENTS

| | | | |
|---|---|---|---|
| 2009/0233546 | A1 | 9/2009 | Sasaki et al. |
| 2010/0167644 | A1 | 7/2010 | Winter et al. |
| 2010/0254481 | A1* | 10/2010 | Nakagawa ............ 375/295 |
| 2011/0106545 | A1 | 5/2011 | Disch et al. |
| 2012/0100804 | A1 | 4/2012 | Miles |
| 2013/0044844 | A1 | 2/2013 | Kothari et al. |
| 2013/0078914 | A1 | 3/2013 | Royston et al. |
| 2013/0084802 | A1 | 4/2013 | Clarke |

FOREIGN PATENT DOCUMENTS

| | | |
|---|---|---|
| KR | 10-2006-0001773 A | 1/2006 |
| WO | WO 2008/117029 A2 | 2/2008 |
| WO | WO 2009/093075 A2 | 7/2009 |

OTHER PUBLICATIONS

International Standard: ISO/IEC 18092, *Information technology—Telecommunications and information exchange between systems—Near Field Communication—Interface and Protocol (NFCIP-1)*, pp. 1-66, First edition, Reference No. ISO/IEC 18092:2004(E), ISO/IEC (Apr. 2004).

Morris, S. and Lefley, A., "A 90nm CMOS 13.56 MHz NFC Transceiver," IEEE Asian Solid-State Circuits Conference Nov. 16-18, 2009, Taipei, Taiwan (2009).

European Search Report for EP Application No. EP 12 00 5708, European Patent Office, The Hague, Netherlands, mailed on Jan. 17, 2013.

International Standard: ISO/IEC 14443, *Identification—Contactless integrated circuits cards—Proximity cards, Part 4: Transmission protocol*, pp. 1-46, Second edition, Reference No. ISO/IEC 14443-4:2008(E), ISO/IEC (Jul. 2008).

International Standard: ISO/IEC 15693, *Indentification cards—Contactless integrated circuit cards—Vicinity cards—Part 3: Anticollision and transmission protocol*, pp. 1-51, First edition, Reference No. ISO/I EC 15693-3:2001 (E), ISO/IEC (Apr. 2001).

European Telecommunications Standard Institute: ETSI TS 102613, *Smart Cards; UICC—Contactless Front-end (CLF) Interface; Part 1: Physical and Data Link Layer Characteristics*, pp. 1-58, Seventh Edition, Reference No. ETSI TS 102613 v.7.6.0 ETSI TS (2009-2010).

International Preliminary Report on Patentability and Written Opinion for International Application No. PCT/GB2010/051491, The International Bureau of WIPO, Geneva, Switzerland, issued Mar. 13, 2012; 9 pages.

English language abstract of KR 10-2006-0001773 A, Thomson Innovation, http://www.thomsoninnovation.com, accessed Nov. 11, 2013, (listed as document FP1 on the accompanying form PTO/SB/08A.

Taiwanese Office Action directed toward related TW Patent Application No. 101132306, dated Apr. 17, 2014 from the Taiwanese Patent Office; 6 pages.

Chinese Office Action directed toward related CN Patent Application No. 201210359834.2, dated Jun. 4, 2014 from the Chinese Patent Office; 8 pages.

* cited by examiner

SHAPED LOAD MODULATION IN A NEAR FIELD COMMUNICATIONS (NFC) DEVICE

BACKGROUND

1. Field of Invention

The invention relates to near field communications (NFC), and more specifically to shaped load modulation in a NFC device.

2. Related Art

Near field communication (NFC) devices are being integrated into mobile devices, such as smartphones for example, to facilitate the use of these mobile devices in conducting daily transactions. For example, instead of carrying numerous credit cards, the credit information provided by these credit cards can be loaded into a NFC device and stored therein to be used as needed. The NFC device is simply tapped to a credit card terminal to relay the credit information to it to complete a transaction. As another example, a ticket writing system, such as those used in bus and train terminals, may simply write ticket fare information onto the NFC device instead of providing a paper ticket to a passenger. The passenger simply taps the NFC device to a reader to ride the bus or the train without the use of the paper ticket.

Conventionally, the credit card information and the ticket fare information are stored onto a NFC device that operates in a target, or tag, mode of operation. This NFC device communicates the information to another NFC device using the information to modulate an impedance across its antenna terminals which is then detected by the other NFC device. This communications scheme is commonly referred to as load modulation. The load modulation should be carefully controlled to prevent introduction of unwanted noise into the communication which may interfere with the communication of the information as well as other communications between other communications devices.

Thus, there is a need to control load modulation in a NFC device that overcomes the shortcomings described above. Further aspects and advantages of the present invention will become apparent from the detailed description that follows.

BRIEF DESCRIPTION OF THE DRAWINGS/FIGURES

The present invention is described with reference to the accompanying drawings. In the drawings, like reference numbers indicate identical or functionally similar elements.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the present invention. Therefore, such adaptations and modifickions are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although, the description of the present invention is to be described in terms of NFC, those skilled in the relevant art(s)

will recognize that the present invention may be applicable to other communications that use the near field and/or the far field without departing from the spirit and scope of the present invention. For example, although the present invention is to be described using NFC capable communication devices, those skilled in the relevant art(s) will recognize that functions of these NFC capable communication devices may be applicable to other communications devices that use the near field and/or the far field without departing from the spirit and scope of the present invention.

An Exemplary Near Field Communications (NFC) Environment

Figure 1:
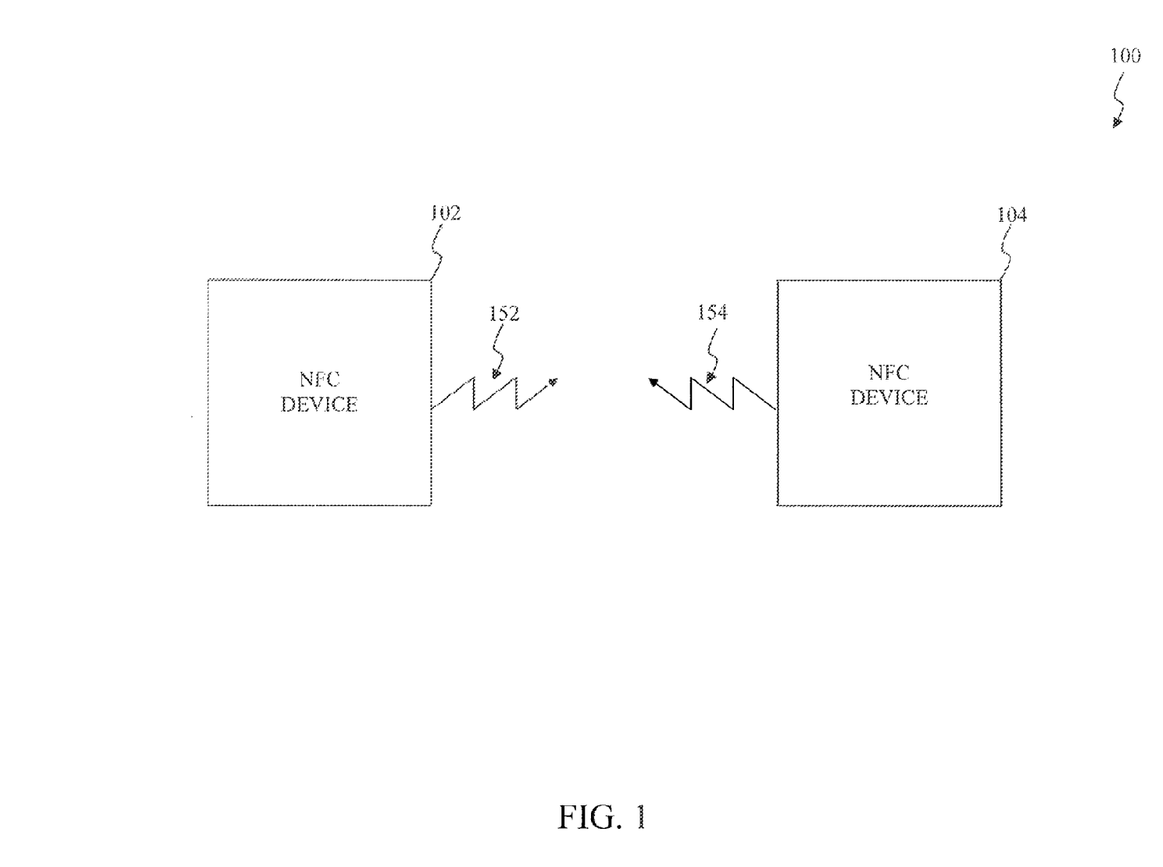
FIG. 1 illustrates a block diagram of a NFC environment according to an exemplary embodiment of the invention.

FIG. 1 illustrates a block diagram of a NFC environment according to an exemplary embodiment of the invention. A NFC environment 100 provides wireless communication of information, such as one or more commands and/or data, among a first NFC device 102 and a second NFC device 104 that are sufficiently proximate to each other. The first NFC device 102 and/or the second NFC device 104 may be implemented as a standalone or a discrete device or may be incorporated within or coupled to another electrical device or host device such as a mobile telephone, a portable computing device, another computing device such as a personal, a laptop, or a desktop computer, a computer peripheral such as a printer, a portable audio and/or video player, a payment system, a ticket writing system such as a parking ticketing system, a bus ticketing system, a train ticketing system or an entrance ticketing system to provide some examples, or in a ticket reading system, a toy, a game, a poster, packaging, advertising material, a product inventory checking system and/or any other suitable electronic device that will be apparent to those skilled in the relevant art(s) without departing from the spirit and scope of the invention.

The first NFC device 102 and/or the second NFC device 104 interact with each other to exchange the information, in a peer (P2P) communication mode or a reader/writer (R/W) communication mode. In, the P2P communication mode, the first NFC device 102 and the second NFC device 104 may be configured to operate according to an active communication mode and/or a passive communication mode. The first NFC device 102 modulates its corresponding information onto a first carrier wave, referred to as a modulated information communication, and generates a first magnetic field by applying the modulated information communication to the first antenna to provide a first information communication 152. The first NFC device 102 ceases to generate the first magnetic field after transferring its corresponding information to the second NFC device 104 in the active communication mode. Alternatively, in the passive communication mode, the first NFC device 102 continues to apply the first carrier wave without its corresponding information, referred to as an unmodulated information communication, to continue to provide the first information communication 152 once the information has been transferred to the second NFC device 104.

The first NFC device 102 is sufficiently proximate to the second NFC device 104 such that the first information communication 152 is inductively coupled onto a second antenna of the second NFC device 104. The second NFC device 104 demodulates the first information communication 152 to recover the information. The second NFC device 104 may respond to the information by modulating its corresponding information onto a second carrier wave and generating a second magnetic field by applying this modulated information communication to the second antenna to provide a second modulated information communication 154 in the active communication mode. Alternatively, the second NFC device 104 may respond to the information by modulating the second antenna with its corresponding information to modulate the first carrier wave to provide the second modulated information communication 154 in the passive communication mode.

In the R/W communication mode, the first NFC device 102 is configured to operate in an initiator, or reader, mode of operation and the second NFC device 104 is configured to operate in a target, or tag, mode of operation. The first NFC device 102 modulates its corresponding information onto the first carrier wave and generates the first magnetic field by applying the modulated information communication to the first antenna to provide the first information communication 152. The first NFC device 102 continues to apply the first carrier wave without its corresponding information to continue to provide the first information communication 152 once the information has been transferred to the second NFC device 104. The first NFC device 102 is sufficiently proximate to the second. NFC device 104 such that the first information communication 152 is inductively coupled onto a second antenna of the second NFC device 104.

The second NFC device 104 derives or harvests power from the first information communication 152 to recover, to process, and/or to provide a response to the information. The second NFC device 104 demodulates the first information communication 152 to recover and/or to process the information. The second NFC device 104 may respond to the information by modulating the second antenna with its corresponding information to modulate the first carrier wave to provide the second modulated information communication 154.

Further operations of the first NFC device 102 and/or the second NFC device 104 may be described in International Standard ISO/IE 18092:2004(E), "Information Technology—Telecommunications and Information Exchange Between Systems—Near Field Communication—Interface and Protocol (NFCIP-1)," published on Apr. 1, 2004 and International Standard ISO/IE 21481:2005(E), "Information Technology—Telecommunications and Information Exchange Between Systems—Near Field Communication—Interface and Protocol-2 (NFCIP-2)," published on Jan. 15, 2005,each of which is incorporated by reference herein in its entirety.

A Conventional NFC Device

Figure 2:
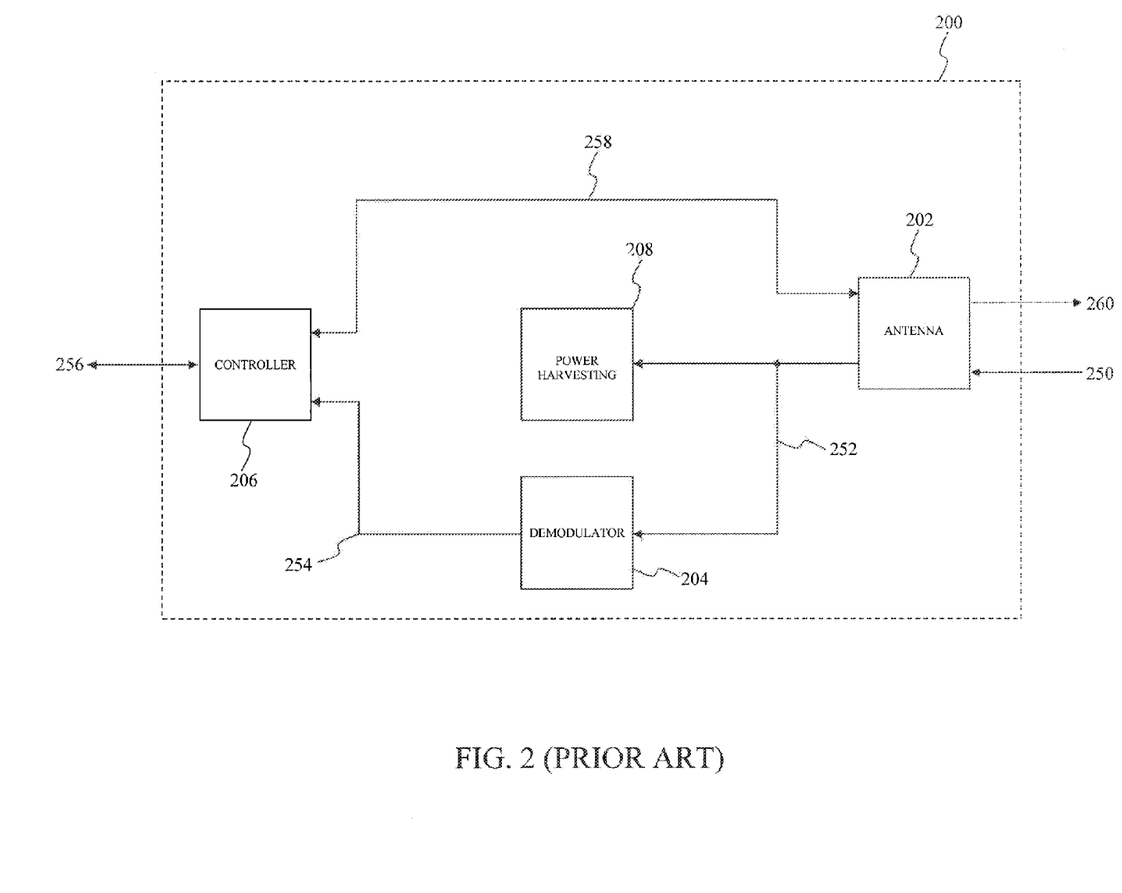
FIG. 2 illustrates a block diagram of a conventional NFC device that may be implemented within the NFC environment according to an exemplary embodiment of the invention.

FIG. 2 illustrates a block diagram of a conventional NFC device that may be implemented within the NFC environment according to an exemplary embodiment of the invention. A conventional NFC device 200 is configurable to operate in the target, or tag, mode of operation to recover, to process, and/or to provide a response to information from another NFC capable device, such as the first NFC device 102 or the second NFC device 104 to provide some examples. The conventional NFC device 200 includes an antenna module 202, a demodulator module 204, a controller module 206, and a power harvesting module 208.

The antenna module 202 inductively receives a received communications signal 250 from the other NFC capable device to provide a recovered communications signal 252. Typically, the received, communications signal 250 may include either the modulated information communication that includes information modulated onto a carrier wave and/or the unmodulated information communication that includes only the carrier wave.

The demodulator module 204 demodulates the recovered communications signal 252 using any suitable analog or digital modulation technique to provide a recovered information sequence 254. The recovered information sequence 254 may include information that is recovered from the modulated information communication. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s) without departing from the spirit and scope of the present invention.

The controller module 206 controls overall operation and/or configuration of the conventional NFC device 200. The controller module 206 transmits and/or receives information 256 to and/or from one or more data storage devices such as one or more contactless transponders, one or more contactless tags, one or more contactless smartcards, any other machine-readable media that will be apparent to those skilled in the relevant art(s) without departing from the spirit and scope of the invention, or any combination thereof. The other machine-readable media may include, but is not limited to, read only memory (ROM), random access memory (RAM), magnetic disk storage media, optical storage media, flash memory devices, electrical, optical, acoustical or other forms of propagated signals such as carrier waves, infrared signals, digital signals to provide some examples. Additionally, the controller module 206 may transmit and/or receive the information 256 to and/or from a user interface such as a touchscreen display, an alphanumeric keypad, a microphone, a mouse, a speaker, any other suitable user interface that will be apparent to those skilled in the relevant art(s) without departing from the spirit and scope of the invention to provide some examples. The controller module 206 may further transmit and/or receive the information 256 to and/or from other electrical devices or host devices coupled to the conventional NFC device 200.

The controller module 206 may use the information 256 to control the overall operation and/or configuration of the conventional NFC device 200. Additionally, the controller module 206 may provide the recovered information sequence 254 as the information 256 and/or provide the information 256 as a transmission sequence 258 for transmission to another NFC capable device. The controller module 206 modulates the received communications signal 250 that is coupled onto the antenna module 202 with the transmission sequence 258 to provide a transmitted communications signal 260. For example, the transmission sequence 258 adjusts an impedance of the antenna module 202 to load modulate the unmodulated information communication inductively coupled onto the antenna module 202 with the transmission sequence 258.

Conventional Transmitted Communications Signal

Figure 3:
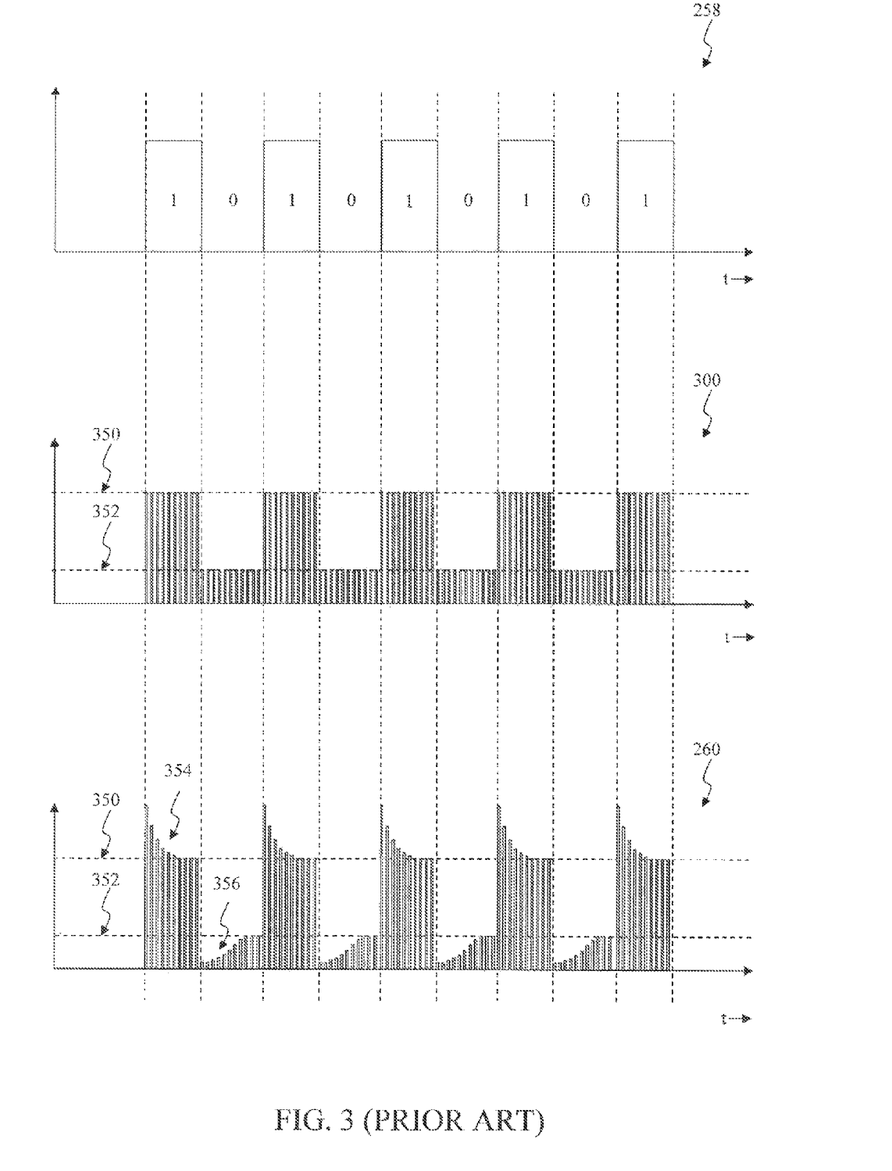
FIG. 3 graphically illustrates a conventional transmitted communications signal that is provided by the conventional NFC device.

FIG. 3 graphically illustrates a conventional transmitted communications signal that is provided by the conventional NFC device. The transmission sequence 258 is in a form of logic values based on the binary number system. The two symbols most commonly chosen to represent the two logic values taken on by binary symbols are binary zero and binary one. A controller module, such as the controller module 206, may encode information using the binary zero and the binary one to provide the transmission sequence. 258. The binary one is represented by a symbol of constant amplitude for the duration of the symbol and the binary zero is represented by switching off the symbol.

Ideally, the controller module 206 modulates an amplitude of the received communications signal 250 in accordance with the transmission sequence 258 to provide a transmitted communications signal 300. The transmission sequence 258 is used to adjust an impedance of the antenna module 202 to be at a first impedance when the transmission sequence 258 is the binary one and/or to be at a second impedance when the transmission sequence 258 is the binary zero. The first impedance of the antenna module 202 causes the transmitted communications signal 300 to be at a first level 350 when the transmission sequence 258 is the binary one and/or the second impedance causes the transmitted communications signal 300 to be at a second level 352 when the transmission sequence 258 is the binary zero.

However, a rise time required for the transmission sequence 258 to transition from the binary zero to the binary one may cause the transmitted communications signal 260 to rise above, commonly referred to as an overshoot condition 354, the first level 350 after the transmission sequence 258 has transitioned from the binary zero to the binary one. In the overshoot condition 354, the transmitted communications signal 260 rises above the first level 350 and may eventually settle to the first level 350. Similarly, a fall time required for the transmission sequence 258 to transition from the binary one to the binary zero, may cause the transmitted communications signal 260 to fall below, commonly referred to as an undershoot condition 356, the second level 352 after the transmission sequence 258 has transitioned from the binary one to the binary zero. In the undershoot condition 356, the transmitted communications signal 260 falls below the second level 352 and may eventually settle to the second level 352.

Conventionally, the antenna module 202 is implemented using a resonant circuit that includes an inductor and a capacitor that are configured and arranged in either a series or a parallel configuration. The rising and/or falling of the transmission sequence 258 charges and/or discharges the capacitor and/or the inductor. A rate at which the capacitor charges and the inductor discharges is related to a rate at which the transmission sequence 258 transitions from the binary zero to the binary one. When the transmission sequence 258 transitions from the binary zero to the binary one too quickly, the capacitor charges at a faster rate than the inductor discharges which results in the overshoot condition 354. Similarly, a rate at which the capacitor discharges and the inductor charges is related to a rate at which the transmission sequence 258 transitions from the binary one to the binary zero. When the transmission sequence 258 transitions from the binary one to the binary zero too quickly, the capacitor discharges at a faster rate than the inductor charges which results in the undershoot condition 356. The antenna module 202, as well as the conventional NFC device 200, may also include one or more unavoidable parasitic capacitances and/or inductances that may similarly be charged and/or discharged in response to the transmission sequence 258 transitioning from the binary zero to the binary one and/or from the binary one to the binary zero.

An Exemplary NFC Device

Figure 4:
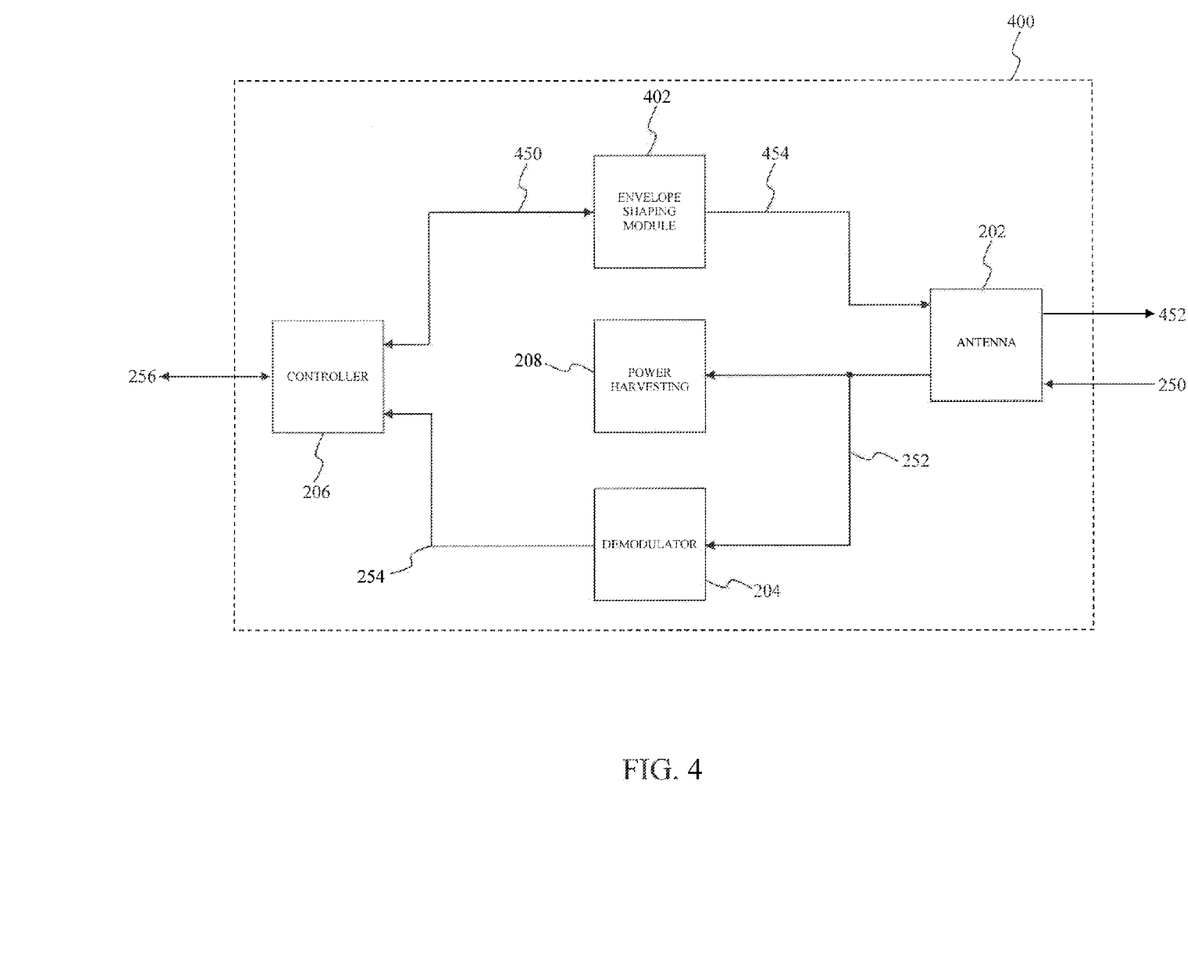
FIG. 4 illustrates a block diagram of a NFC device that may be implemented within the NFC environment according to an exemplary embodiment of the invention.

FIG. 4 illustrates a block diagram of a NFC device that may be implemented within the NFC environment according to an exemplary embodiment of the invention. A NFC device 400 is configurable to operate in the target, or tag, mode of operation to recover, to process, and/or to provide a response to information from another NFC capable device, such as the first NFC device 102 or the second NFC device 104 to provide some examples. The NFC device 400 lengthens a rise time and/or a fall time of its information to be transmitted to substantially reduce overshoot and/or undershoot when compared to the conventional NFC device 200. The NFC device 400 includes the antenna module 202, the demodulator module 204, the controller module 206, the power harvesting module 208, and an envelope shaping module 402. The NFC device 400 may represent an exemplary embodiment of the first NFC device 102 and/or the second NFC device 104. The NFC device 400 shares many substantially similar features as the conventional NFC device 200; therefore, only differences between the conventional NFC device 200 and the NFC device 400 are to be discussed below.

The controller module 206 may provide the information 256 as a transmission sequence 450 for transmission to another NFC capable device. The controller module 206 may encode the information 256 according to an on-off signaling scheme, a non-return-to-zero (NRZ) scheme, a bipolar scheme, a Manchester code, or any other amplitude, frequency, and/or phase encoding scheme that will be apparent to those skilled in the relevant art(s) without departing from the spirit and scope of the present invention.

The envelope shaping module 402 modifies the transmission sequence 450 to modify an envelope of a transmitted communications signal 452 to provide a modified transmission sequence 454. The transmission sequence 450 is used to modulate the received communications signal 250 that is coupled onto the antenna module 202 to provide the transmitted communications signal 452. The envelope shaping module 402 modifies or shapes the transmission sequence 450 according to a shaping envelope to lengthen its rise time and/or fall time when compared to the rise time and/or the fall time of the transmission sequence 258. This increase in the rise time and/or the fall time of the transmission sequence 450 substantially reduces overshoot and/or undershoot of the NFC device 400 when compared to the conventional NFC device 200.

For example, the shaping envelope may represent a waveshaper that applies a fixed or variable mathematical function to the transmission sequence 450 to substantially lengthen its rise time and/or fall time when compared to the rise time and/or the fall time of the transmission sequence 258. Generally, the modified transmission sequence 454 may be represented as:

$$y(n) = f(x(n)), \quad (1)$$

where y(n) represents the modified transmission sequence 454, x(n) represents the transmission sequence 450, and $f(\cdot)$ represents a waveshaping shaping function. The waveshaping shaping function may represent a trigonometric function, a polynomial function, a piecewise function, or any other function that lengthens the rise time and/or the fall time of the transmission sequence 450 when compared to the transmission sequence 258 that will be apparent to those skilled in the relevant art(s) without departing from the spirit and scope of the present invention. In an exemplary embodiment, the polynomial function may be represented as:

$$y(n) = \sum_{n=0}^{K} \frac{a_n}{x(n)^n}, \quad (2)$$

where y(n) represents the modified transmission sequence 454, x(n) represents the transmission sequence 450, and $a_n$ represents any suitable gain coefficient.

Exemplary Envelope Shaping Module

Figure 5:
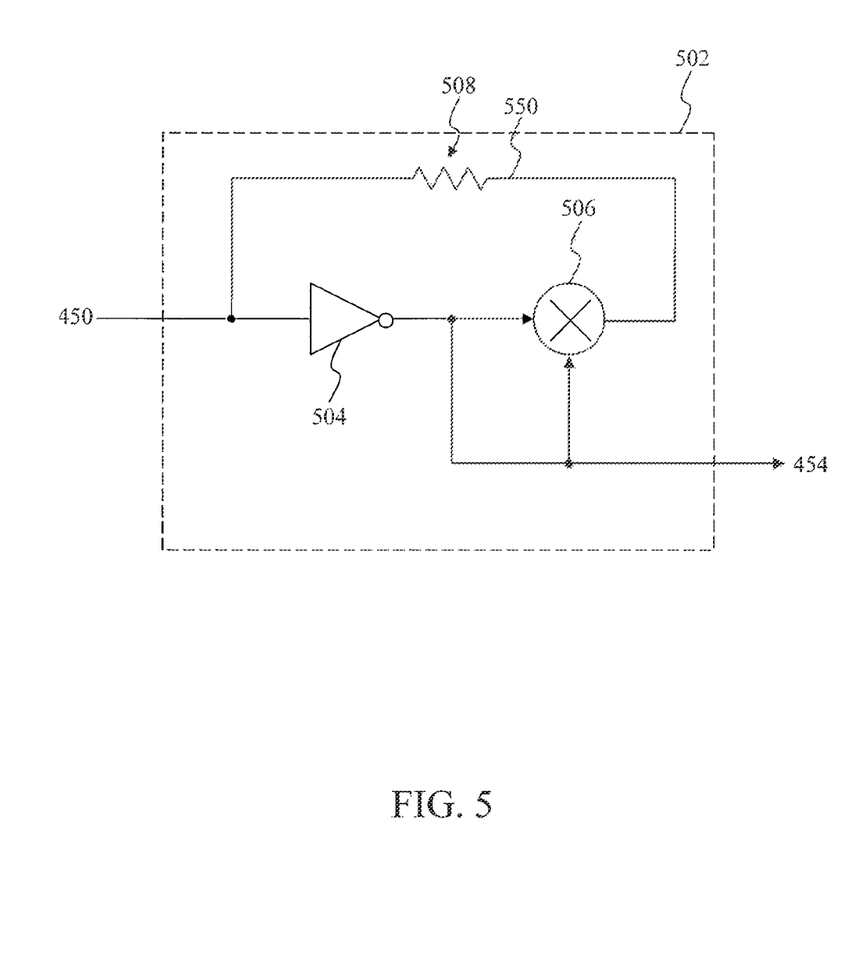
FIG. 5 illustrates a block diagram of an envelope shaping module that may be implemented within the NFC device according to an exemplary embodiment of the invention.

FIG. 5 illustrates a block diagram of an envelope shaping module that may be implemented within the NFC device according to an exemplary embodiment of the invention. A waveshaper 502 applies a wave shaping function to the transmission sequence 450 to lengthen its rise time and/or fall time when compared to the rise time and/or the fall time of the transmission sequence 258. As shown in FIG. 5, the waveshaper 502 is configured and arranged to perform an inverse square function that may be denoted as:

$$y(n) = \frac{a_2}{x(n)^2}, \quad (3)$$

where y(n) represents the modified transmission sequence 454, x(n) represents the transmission sequence 450, and $a_2$ represents any suitable gain coefficient which is typically one. The waveshaper 502 includes an inverter 504, a multiplier 506, and a feedback resistor 508. The waveshaper 502 may represent an exemplary embodiment of the envelope shaping module 402.

The inverter 504 inverts the transmission sequence 450 to provide the modified transmission sequence 454.

The multiplier 506 multiplies the modified transmission sequence 454 with itself to provide a squared transmission sequence 550. The multiplier 506 effectively raises the modified transmission sequence 454 to a power of two or squares the modified transmission sequence 454 to provide the squared transmission sequence 550.

The feedback resistor 508 provides the squared transmission sequence 550 to the inverter 504 to result in the inverse square function.

Exemplary Transmitted Communications Signal

Figure 6:
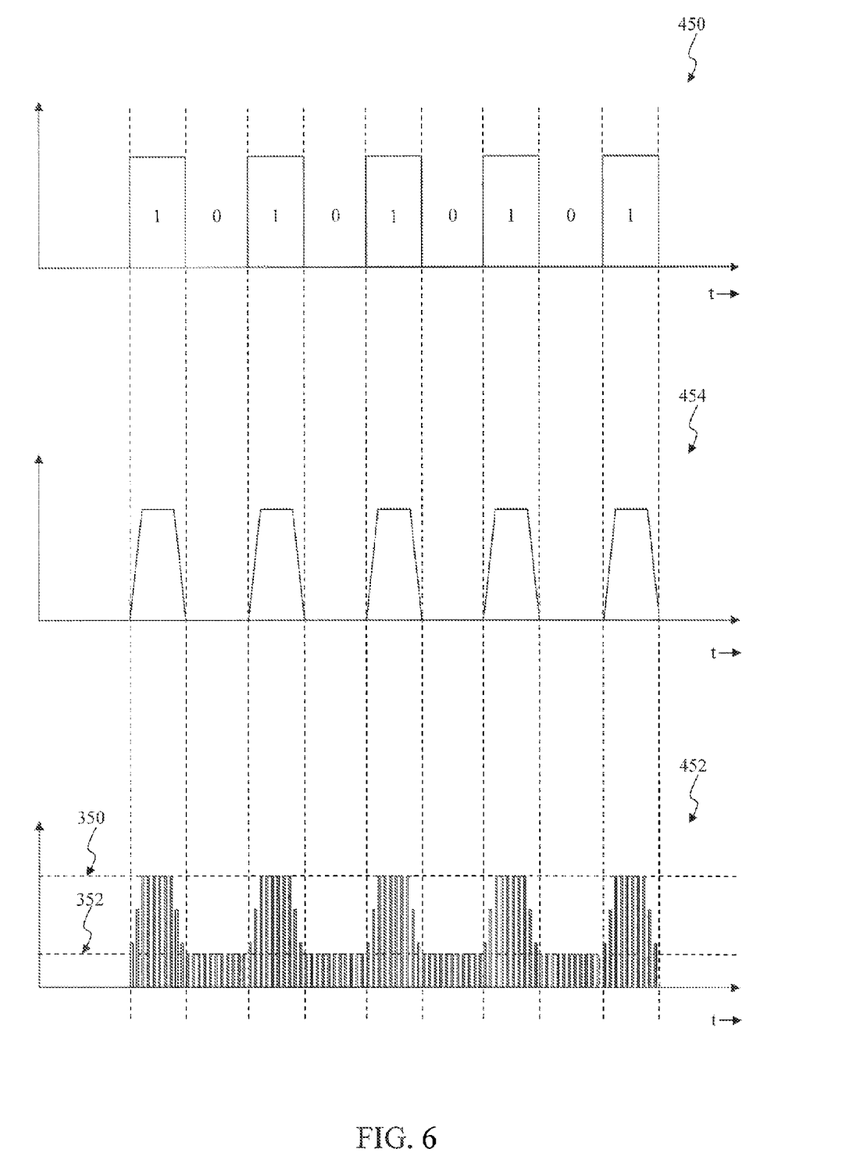
FIG. 6 graphically illustrates a transmitted communications signal that is provided by the NFC device according to an exemplary embodiment of the present invention.

FIG. 6 graphically illustrates a transmitted communications signal that is provided by the NFC device according to an exemplary embodiment of the present invention. The transmission sequence 450 is in a form of logic values based on the binary number system. The two symbols most commonly chosen to represent the two logic values taken on by binary symbols are binary zero and binary one. As shown in FIG. 6, a controller module, such as the controller module 206, may encode information using the binary zero and the binary one to provide the transmission sequence 450. The binary one is represented by a symbol of constant amplitude for the duration of the symbol and the binary zero is represented by switching off the symbol.

An envelope shaping module, such as the envelope shaping module 402, modifies the transmission sequence 450 to provide the modified transmission sequence 454. The envelope shaping module 402 modifies or shapes the transmission sequence 450 according to a shaping envelope to substantially lengthen its rise time and/or fall time when compared to the rise time and/or the fall time of the transmission sequence 258.

The controller module 206 modulates the amplitude of the received communications signal 250 in accordance with the modified transmission sequence 454 to provide the transmitted communications signal 452. The modified transmission sequence 454 is used to adjust the impedance of the antenna module 202 to be at the first impedance when the modified transmission sequence 454 is the binary one and/or to be at the second impedance when the modified transmission sequence 454 is the binary zero. The first impedance of the antenna module 202 causes the transmitted communications signal 452 to be at the first level 350 when the modified transmission sequence 454 is the binary one and/or the second impedance causes the transmitted communications signal 452 to be at the second level 352 when the modified transmission sequence 454 is the binary zero.

As discussed above, the antenna module 202 is implemented using a resonant circuit that includes an inductor and a capacitor that are configured and arranged in either a series or a parallel configuration. The rising and/or falling of the modified transmission sequence 454 charges and/or discharges the capacitor and/or the inductor. The longer rise time of the modified transmission sequence 454 allows more time for the capacitor to charge and the inductor to discharge when the modified transmission sequence 454 transitions from the binary zero to the binary one. This longer rise time substantially reduces, or altogether eliminates, the overshoot condition 354. For example, the longer rise time allows to the inductor to be completely discharged before the modified transmission sequence 454 completes its transition from the binary zero to the binary one. Similarly, the fall time of the modified transmission sequence 454 allows more time for the capacitor to discharge and the inductor to charge when the modified transmission sequence 454 transitions from the binary one to the binary zero. This longer rise time and/or fall time substantially reduces, or altogether eliminates, the undershoot condition 356. For example, the longer fall time allows to the capacitor to be completely discharged before the modified transmission sequence 454 completes its transition from the binary one to the binary zero.

CONCLUSION

It is to be appreciated that the Detailed Description section, and not the Abstract section, is intended to be used to interpret the claims. The Abstract section may set forth one or more, but not all exemplary embodiments, of the present invention, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various transitions in form and detail can be made therein without departing from the spirit and scope of the invention. Thus the present invention should not be limited by any of the above-described exemplary embodiments, but should be defined only in accordance with the following claims and their equivalents.

What is claimed is:

1. A near field communications (NFC) device, comprising:
   a controller configured to provide a transmission sequence to be transmitted to another communications device; and
   an envelope shaping module configured to shape the transmission sequence according to a shaping envelope to provide a modified transmission sequence and to load modulate an antenna with the modified transmission sequence.

2. The NFC device of claim 1, wherein the shaping envelope is a mathematical function that is applied to the transmission sequence.

3. The NFC device of claim 2, wherein the mathematical function is a polynomial function.

4. The NFC device of claim 3, wherein the polynomial function is represented as:

$$y(n) = \sum_{n=0}^{K} \frac{a_n}{x(n)^n},$$

where y(n) represents the modified transmission sequence, x(n) represents the transmission sequence, and $a_n$ represents a gain coefficient.

5. The NFC device of claim 2, wherein the mathematical function is an inverse square function.

6. The NFC device of claim 5, wherein the inverse square function is represented as:

$$y(n) = \frac{1}{x(n)^2},$$

where y(n) represents the modified transmission sequence and x(n) represents the transmission sequence.

7. The NFC device of claim 1, wherein the envelope shaping module comprises:
   an inverter configured to invert the transmission sequence to provide the modified transmission sequence; and
   a multiplier configured to multiply the modified transmission sequence with itself to provide a squared transmission sequence,
   wherein the squared transmission sequence is fed back to the inverter to provide an inverse square function.

8. The NFC device of claim 1, wherein the envelope shaping module is configured to shape the transmission sequence such that no substantial overshoot and undershoot are present in the modified transmission sequence.

9. The NFC device of claim 1, wherein the antenna includes an impedance, the impedance being configured to be adjusted by the modified transmission sequence to load modulate a carrier wave from another NFC device that is inductively coupled onto the antenna.

10. The NFC device of claim 1, wherein the antenna includes a capacitor and an inductor,
    wherein the inductor or the capacitor are completely discharged before the modified transmission sequence transitions from a binary zero to a binary one, and
    wherein the inductor or the capacitor are completely charged before the modified transmission sequence transitions from the binary one to the binary zero.

11. The NFC device of claims 1, wherein the envelope shaping module is further configured to lengthen a rise time or a fall time of the transmission sequence.

12. A method of communication in a near field communications (NFC) device, comprising:
    generating, by the NFC device, a transmission sequence to be transmitted to another communications device;
    shaping, by the NFC device, the transmission sequence according to a shaping envelope to provide a modified transmission sequence; and
    modulating, by the NFC device, a carrier wave from another NFC device with the modified transmission sequence.

13. The method of claim 12, wherein shaping comprises:
    shaping the transmission sequence according to a mathematical function that is applied to the transmission sequence.

14. The method of claim 13, wherein the mathematical function is a polynomial function.

15. The method of claim 14, wherein the polynomial function is:

$$y(n) = \sum_{n=0}^{K} \frac{a_n}{x(n)^n},$$

where y(n) represents the modified transmission sequence, x(n) represents the transmission sequence, and $a_n$ represents a gain coefficient.

16. The method of claim 13, wherein the mathematical function is an inverse square function.

17. The method of claim 16, wherein the inverse square function is represented as:

$$y(n) = \frac{1}{x(n)^2},$$

where y(n) represents the modified transmission sequence and x(n) represents the transmission sequence.

18. The method of claim 12, wherein shaping comprises:
inverting the transmission sequence to provide the modified transmission sequence;
multiplying the modified transmission sequence with itself to provide a squared transmission sequence; and
inverting the squared transmission sequence to obtain the inverse square function.

19. The method of claim 12, wherein shaping comprises:
shaping the transmission sequence such that no substantial overshoot and undershoot are present in the modified transmission sequence.

20. The method of claim 12, wherein modulating comprises:
adjusting an impedance with the modified transmission sequence to load modulate the carrier wave.

21. The method of claim 12, wherein generating comprises:
encoding an amplitude of an information sequence to provide the transmission sequence.

22. The method of claim. 12, wherein shaping comprises:
lengthening a rise time or a fall time of the transmission sequence.

* * * * *

UNITED STATES PATENT AND TRADEMARK OFFICE
CERTIFICATE OF CORRECTION

PATENT NO.        : 8,831,515 B2
APPLICATION NO.   : 13/271553
DATED             : September 9, 2014
INVENTOR(S)       : David S. Clarke It is certified that error appears in the above-identified patent and that said Letters Patent is hereby corrected as shown below:

In the Claims

At column 10, line 48, replace "claims 1" with --claim 1--.

At column 12, line 20, replace "claim. 12" with --claim 12--.

Signed and Sealed this
Sixth Day of January, 2015

Michelle K. Lee
*Deputy Director of the United States Patent and Trademark Office*